(12) United States Patent
Hanika-Heidl et al.

(10) Patent No.: US 10,481,272 B2
(45) Date of Patent: Nov. 19, 2019

(54) RADIO NAVIGATION DEVICE AND METHOD FOR RECEIVING, EVALUATING AND PROCESSING FAULTY NAVIGATION SIGNALS

(71) Applicant: NEUSOFT TECHNOLOGY SOLUTIONS GMBH, Hamburg (DE)

(72) Inventors: Stefan Hanika-Heidl, Pinneberg (DE); Laurenz Pruessner, Hamburg (DE); Veit Droege, Hamburg (DE); Michael Rieck, Hamburg (DE)

(73) Assignee: Neusoft Technology Solutions GmbH, Hamburg (DE)

( * ) Notice: Subject to any disclaimer, the term of this patent is extended or adjusted under 35 U.S.C. 154(b) by 357 days.

(21) Appl. No.: 15/036,041

(22) PCT Filed: Nov. 11, 2014

(86) PCT No.: PCT/EP2014/003024
§ 371 (c)(1),
(2) Date: May 11, 2016

(87) PCT Pub. No.: WO2015/067379
PCT Pub. Date: May 14, 2015

(65) Prior Publication Data
US 2016/0282471 A1    Sep. 29, 2016

(30) Foreign Application Priority Data

Nov. 11, 2013   (DE) ........................ 10 2013 018 807

(51) Int. Cl.
*G01S 19/05*    (2010.01)
*G01S 19/48*    (2010.01)
(Continued)

(52) U.S. Cl.
CPC .............. *G01S 19/05* (2013.01); *G01S 19/48* (2013.01); *G01S 5/009* (2013.01); *G01S 19/07* (2013.01); *G01S 19/41* (2013.01)

(58) Field of Classification Search
CPC .......... G01S 19/05; G01S 19/48; G01S 19/07; G01S 19/41; G01S 5/009
(Continued)

(56) References Cited

U.S. PATENT DOCUMENTS 5,293,318 A    3/1994  Fukushima
5,311,195 A    5/1994  Mathis et al.
(Continued)

FOREIGN PATENT DOCUMENTS

| DE | 10 2009 045326 | 4/2011 |
|---|---|---|
| DE | 10 2013 018807 | 10/2013 |
| WO | WO 2008/143497 | 11/2008 |

OTHER PUBLICATIONS

Communication of further Notices of Opposition pursuant to Rule 79(2) EPC, in Application No. 07747469.0, dated Feb. 7, 2017; 2 pages.

(Continued)

*Primary Examiner* — Chuong P Nguyen
(74) *Attorney, Agent, or Firm* — Fish & Richardson P.C.

(57) ABSTRACT

In some implementations, the radio navigation device has a data bank or may be associated with the latter, which data bank provides substantially statically stored, pre-determinable positioning data on defined, predictable regions or areas, and the data bank sends error information of the received radio navigation signals to the evaluating apparatus and/or to a user terminal dependently upon pre-defined location information relating to predictable regions or areas of deficient or lacking radio navigation signal reception.

15 Claims, 6 Drawing Sheets

(51) Int. Cl.
*G01S 19/07* (2010.01)
*G01S 5/00* (2006.01)
*G01S 19/41* (2010.01)

(58) Field of Classification Search
USPC ............ 342/357.42, 357.44, 357.64, 357.28
See application file for complete search history.

(56) References Cited

U.S. PATENT DOCUMENTS

| | | | |
|---|---|---|---|
| 6,502,033 B1 | 12/2002 | Phuyal | |
| 6,658,353 B2 | 12/2003 | Shimizu et al. | |
| 7,339,526 B2* | 3/2008 | Zimmerman | G01S 5/009 |
| | | | 342/357.27 |
| 8,842,043 B2* | 9/2014 | McDanell | H04B 7/18517 |
| | | | 342/357.68 |
| 9,134,429 B2* | 9/2015 | T'Siobbel | G01C 21/165 |
| 9,408,175 B2* | 8/2016 | MacGougan | H04W 4/023 |
| 9,681,269 B2* | 6/2017 | MacGougan | H04W 4/025 |
| 10,223,744 B2* | 3/2019 | Brady | G06Q 40/02 |
| 2006/0189324 A1 | 8/2006 | Anderson | |
| 2006/0271295 A1 | 11/2006 | McLaren et al. | |
| 2006/0284765 A1* | 12/2006 | Bernhardt | G01S 19/34 |
| | | | 342/357.31 |
| 2007/0005243 A1 | 1/2007 | Horvitz et al. | |
| 2009/0149201 A1* | 6/2009 | Ryu | G01S 5/0263 |
| | | | 455/456.6 |
| 2010/0138147 A1* | 6/2010 | T'Siobbel | G01C 21/165 |
| | | | 701/533 |
| 2011/0307171 A1* | 12/2011 | Waite | G01C 21/30 |
| | | | 701/421 |
| 2012/0209519 A1 | 8/2012 | Basnayake | |
| 2014/0266873 A1* | 9/2014 | Pighin | G01S 19/40 |
| | | | 342/357.23 |
| 2016/0146616 A1* | 5/2016 | Ren | G01C 21/30 |
| | | | 701/409 |
| 2017/0074659 A1* | 3/2017 | Giurgiu | G01S 19/41 |
| 2017/0363744 A1* | 12/2017 | Miya | G01S 19/07 |

OTHER PUBLICATIONS

Written Opinion in Application No. PCT/EP2014/003024, dated May 26, 2016, 14 pages.

* cited by examiner

RADIO NAVIGATION DEVICE AND METHOD FOR RECEIVING, EVALUATING AND PROCESSING FAULTY NAVIGATION SIGNALS

CROSS-REFERENCE TO RELATED APPLICATIONS

This application is a U.S. National Stage of, and claims priority to, under 35 USC 371, WO Patent Application No. PCT/EP2014/003024, titled "Radio navigation device and method for receiving, evaluating and processing faulty navigation signals," filed on Nov. 11, 2014, which is the country equivalent to DE Patent Application No. 10 2013 018 807.5, titled "Radio navigation device and method for receiving, evaluating and processing faulty navigation signal," filed on Nov. 11, 2013. The disclosure of each of the foregoing applications is incorporated herein by reference.

FIELD

The present invention relates to a radio navigation device for receiving, evaluating and processing in particular faulty navigation signals, containing a number of receiving apparatuses and at least one evaluating apparatus, and to a corresponding method, in particular using the radio navigation device.

BACKGROUND

Radio navigation devices contain IT-supported technical systems which, with the aid of position determination (satellite, radio, GSM (Global System for Mobile Communications) and inert or autonomous systems) and geo-information (topology, road, air or sea maps) enable destination guidance to a selected location or a route that takes desired criteria into account.

The navigation and positioning of vehicles, transmissions and machines generally takes place on the basis of satellite-supported locating systems. However, the locating data are often not only inherently inaccurate, but totally or partially fail depending on the location, for example in tunnels, gorges or under bridges. At these locations the position determination by means of satellites is either defective and faulty or completely fails, and this is why when these systems fail, other receiving apparatuses or sensors, for example pedometers, compasses, acceleration sensors, have to be used. However, these systems have additive errors, i.e. the longer the failure of the satellite-supported sensor system lasts, the less precise the position calculated from the remaining sensors becomes. In mobile applications location-dependent factors can contribute to the worsening of the quality of individual sensor data. This location-dependent worsening of the data quality may lead to the total failure of entire sensor systems, and in particular it may partially or also totally disrupt the reception of the satellite-supported position determination.

If, for example, a conventional GPS-supported position determination system approaches an interference point, such as for example a tunnel, the GPS connection does not suddenly fail. Rather, the GPS determination becomes less accurate in the transition phase of approaching. This results from the fact that depending on the position, some of the GPS satellites continue to send signals to the interference point, whereas others are already totally blocked by the interference point so that overall, less data suppliers are available from which an error can be averaged. This fact leads disadvantageously to the aforementioned problem that conventional GPS-supported position determination systems increasingly receive faulty data while, for example, driving into a tunnel, onto which they then extrapolate after the failure of the GPS system, and so increase the error further, without taking any appropriate counter-measures.

In addition, the use of some sensor systems is associated with high costs. Position determination by means of WLAN (Wireless Local Area Network) or radio telephone masts requires a considerable amount of energy input and generally also requires a continuous on-line connection.

Essentially two methods are currently known from the prior art in order to improve this situation:

On the one hand, following the failure of the satellite-supported positioning system, triangulation with mobile telephony radio masts with known positions is carried out or comparable radio networks, for example WLAN, are compared with a dynamic data bank. However, this requires an extensive data bank subject to constant change and in which this information is kept and administered. This databank is generally so large that it is not kept locally, but is stored on central servers. Therefore, access to such data banks requires on-line access which is also often disrupted in the problem areas that have been described.

On the other hand, integrated navigation systems carry map data for large regions in which road guides are recorded with which the positions calculated by the remaining sensor system can be corrected with the exclusion of "impossible" positions. However, these map data are expensive because they are marketed commercially and, due to their size, require extensive local memories, for example hard discs or CDs/DVDs. Moreover, they mainly focus on road guides, and not on regional access restrictions such as tunnels, bridges, ferries, gorges. This gives rise, on the one hand, to high costs for maps and their storage, and on the other hand it reduces the problem cases to known roads. However, interference may also occur independently of the course of the road, e.g. due to crossing overhead power lines, tram voltage supply cables or "blocking" by orientation points ("landmarks") such as, for example, the Eiffel Tower, canopies, skyscrapers. In these cases the use of a road map to support the position determination is useful, but the aforementioned cases are still problematic. In addition, navigation systems generally operate reactively, i.e. only after the satellite-supported position sensor system has failed does one resort to alternative systems. It is disadvantageous here that there is no "anticipated blockade" prediction, nor can one have any trust in its data before the satellite-supported system fails.

DETAILED DESCRIPTION OF THE INVENTION

Therefore, the object underlying the present invention is to provide an appropriate device and a corresponding method which overcome the aforementioned disadvantages proactively, guarantee a high degree of positioning accuracy and give rise to low costs. Another object is to convert optimal knowledge of the regions and areas that are predictably prone to interference as easily and efficiently as possible into corresponding positioning and navigation.

These objects are achieved by the device that has the features according to Claim 1 and by the method that has the features according to Claims 6 and 7.

One essential aspect of the present invention is that the radio navigation device has a data bank or is associated with the latter, which data bank provides substantially statically stored, pre-determinable positioning data on defined, predictable regions or areas, and the data bank sends error information of the received radio navigation signals to the evaluating apparatus and/or to a user terminal dependently upon pre-defined location information relating to predictable regions or areas of deficient or lacking radio navigation signal reception.

The navigation device according to the invention can thus, for example, use previous measured values of its position and an estimate of speed to recognise predictably whether it is moving towards an interference point stored in the data bank. By sending the error information of the received radio navigation signals the navigation device can advantageously start to "mistrust" the satellite-supported radio navigation signals before reaching the interference point before these data clearly arrive with errors. Accordingly, recognition preferably takes place locally, and not by means of a recognised error in the radio signal.

Additional advantageous configurations are the subject matter of the sub-claims.

Preferably, the positioning data of the data bank are pre-determined spatially and/or temporally and comprise predictable regions or areas of deficient or lacking navigation signal reception. Therefore, only regions or areas of deficient or lacking navigation signal reception ("Areas of Restricted Sensoric Coverage") are recorded in the data bank ("interference point data bank"). The amount of data is very small and inexpensive compared with complete map data, and so the entire globe can be covered with just a few MB (MegaBytes).

Therefore, the position determination in "critical regions" is considerably improved by "impossible" or "very unlikely" positions being predictably recognised and ruled out with weighting. It is made possible to return position data that have been calculated wrongly or have probably been calculated wrongly to "more likely" positions, and both the relative and the absolute error is reduced. The failure of certain sensor systems, for example satellite-supported position determination, can therefore be predicted before the actual failure and can thus optionally be avoided in favour of alternative systems before the actual chronological failure. The "interference point data bank" is located, for example, on a data store of the navigation system on a ROM or flash read-only memory or on a hard disc. This can mean that the data are stored on the same medium that also keeps the programme code of the position determination system.

Preferably, at least one of the or a number of receiving apparatuses can optionally be activated or deactivated location-dependently and/or at pre-defined times in predictable regions or areas of deficient or lacking radio navigation signal reception.

Therefore, in this embodiment the positioning data of the data bank are used to activate sensors, for example in the vehicle, which have not previously been used. This can be, for example, an inexpensive LED (Light-Emitting Diode) which measures the distance to a tunnel wall. In this embodiment the navigation device includes a number of sensor data from a number of receiving apparatuses in its calculations. As well as GPS or similar satellite-supported systems, these are also, for example, incremental sensors on car tyres, gyrocompasses, magnetic field sensors or sonar data.

The activation/deactivation of additional sensors is therefore an optional reaction which the navigation device can implement upon reaching interference points in order to advantageously achieve further improvement of the positioning accuracy. As well as simple and inexpensive distance diodes, complex and expensive systems, for example cameras, can also be used.

Preferably, the at least one receiving apparatus that can be pre-definably activated or deactivated depending on location and/or time in predictable regions or areas of deficient or lacking radio navigation signal reception provides range data which specify and/or weight the relative position of objects in the predictable regions or areas of deficient or lacking radio navigation signal reception.

The weighting with which individual sensor data are introduced into the position determination can be made to be location-dependent. One can attach greater importance to other sensors or only actually activate them e.g. in the vicinity of specific orientation points ("landmarks", for example gorges or regions, for example "inner city") even if e.g. the satellite-supported positioning has not yet totally failed, e.g. record or disconnect WLAN-SSIDs (Wireless Local Area Network-Service Set Identifier) of the surrounding area or GSM radio cells depending on the population density or DSL (Digital Subscriber Line) structure, use radio tuners in order to ensure that tunnel entries are recognised etc.

Essential basic elements of the method according to the invention, preferably for satellite-supported position determination, for receiving, evaluating and processing navigation signals, in particular using the previously described radio navigation device, comprise the following steps:
 a) providing at least one of the or a number of receiving apparatuses and at least one evaluating apparatus and a data bank defined by a satellite;
 b) connecting the evaluating apparatus to the data bank defined by a satellite, the data bank having positioning data which are pre-determined spatially and/or temporally and comprising exclusively predictable, statically stored regions or areas of deficient or lacking radio navigation signal reception;
 c) sending the pre-determined positioning data of the data bank defined by a satellite dependently upon pre-defined location information with regard to predictable regions or areas of deficient or lacking radio navigation signal reception and error information of the received navigation signals to the evaluating apparatus and/or a user terminal; and
 d) determining the corrected position of at least one receiving apparatus by using the positioning data of the data bank defined by a satellite.

An advantageous improvement of the conventional GPS-supported position determination system is thus achieved by the present device totally dispensing with the use of the GPS data in good time before the location-related start of the blocking region or by the remaining data being rated as less trustworthy data. Therefore, the previously greatly increasing blocking error is not introduced upon entering a tunnel, or at least is less strongly weighted in the calculation.

Preferably, with deficient or lacking radio navigation signal reception, the received deficient navigation signal data are additionally eliminated.

Preferably, upon connecting the evaluating apparatus to the data bank, at least one of the receiving apparatuses is pre-definably switched on or off depending on the location and/or time or is optionally activated or deactivated in predictable regions or areas of deficient or lacking radio navigation signal reception.

Therefore, the system itself determines a more precise position if no additional receiving apparatuses or sensors are additionally activated, but only the faulty GPS signal is removed from the calculation in good time. The additional activation of other systems constitutes another embodiment for further improving the overall system, which improvement will be explained below.

Preferably, range data are provided by the at least one receiving apparatus that can be pre-definably switched on or off, be activated or deactivated in predictable regions or areas of deficient or lacking radio navigation signal reception, which range data specify and/or weight the relative position of objects in the predictable regions or areas of deficient or lacking radio navigation signal reception.

The position determination in "critical regions" is therefore advantageously improved by "impossible" or "very unlikely" positions being recognised and ruled out with weighting. It is made possible to return calculated position data which are faulty or probably fault to "more likely" positions, and both the relative and the absolute error is reduced. The failure of certain sensor systems, for example satellite-supported position determination, can be predicted before the actual failure, and so can be diverted to alternative systems before the chronological failure, i.e. to other receiving apparatuses. According to the invention it is however sufficient to remove the deficient or lacking radio navigation signals from the signal chain in good time and so give greater importance to the remaining data of the overall system, for example data on the course of the road within the interference region from the "interference point data bank", range data of a wheel sensor, compass data.

Therefore, the invention is based on the provision of a data bank of "interference areas" that includes e.g. the coordinates of tunnels, bridges, parking decks, mountain passes, gorges or other "interference objects".

In comparison to conventional navigation maps and navigation systems this data bank has numerous advantages:

The data bank is comparably small, even when it includes the whole known globe, because it only includes regions or areas of deficient or lacking navigation signal reception, i.e. "interference points" in compressed form instead of complete road data, in conventional navigation maps roads with many attributes such as speed limit, number of lanes, road type etc. being provided.

Furthermore, the data bank does not require any updates over long periods of time because tunnels, bridges, gorges etc. do not change position either at all, or only by means of very long building projects. Over the life span of normal vehicles, machines or consignments that are in use for a few days to two decades, the changes can be considered to be so negligibly small that a data "update" is rarely to never required.

If an update is required, only a fraction of the data, which is already small in quantity, need be revised. The addition of another section to the Elbe Tunnel in Hamburg is, for example, a construction project that was planned over extremely long periods of time, and even when it is actually completed, only a few bytes will be required in order to adapt the data bank to this new version.

The required data can be taken from freely accessible data banks because less precision and "data quality" is required in order to fulfil the described purpose. The information of the positioning data (interference points) stored in the data bank can be determined and calculated by different methods. On the one hand these data can be determined empirically by carrying out test drives, and the disrupted navigation signal reception is documented and stored dependently upon location. Alternatively, one can fall back on existing map material (preferably in electronic form), and the interference points can be calculated from this by considering the attributes (e.g. evaluation of a tunnel attribute). The geological consideration of the area of application is also a possibility for predicting with high probability potential interference points or the areas where they will start and finish (e.g. mountain situations). In any case, positions, regions and metainformation are stored in the interference point data bank. Every interference point is additionally typed according to the following classification:

Type 1 No reception (e.g. tunnel)
Type 2 Reduced signal strength (e.g. wooded areas)
Type 3 Restricted view of the sky (e.g. mountain location, avalanche breaks, gorges)
Type 4 Signal reflection (e.g. street canyons)

It is therefore possible in the navigation device according to the invention, differently adapted algorithmically, to respond to the interference point according to its typing.

The "interference point data bank" serves as the basis for the steps of the method:

After the failure of the satellite-supported position determination, position data calculated by the remaining sensor system can be corrected by excluding "impossible positions" (e.g. 30 m to the right of the wall of the Elbe Tunnel"). Advantageously, a comprehensive road map as used by conventional navigation systems is now no longer required, but only the less expensive and smaller "interference point data bank" which is therefore also quicker to process. This reduces both the absolute and the relative error of the position determination.

The failure of certain sensor systems, for example the GPS (Global Positioning System) satellite cover, can be predicted before it occurs. This means that the system can record its mistrust of these data hundreds of meters before total "blocking" of the satellite signals and, instead of continuing to trust the remaining satellite signals with large errors, it can divert in good time to other sensors before its calculation is interfered with by the increasing error of the satellite data.

Expensive, energy-consuming alternative sensors can therefore be switched on and off again in good time (e.g. WLAN scans, distance detectors for tunnel walls, camera systems) so that their start and calibration times do not any longer subject the system to additive errors.

Another important aspect which is made possible by the interference point data bank relates to the exit from the regions with deficient or lacking radio navigation signal reception or the re-entry into the allegedly non-disrupted receipt region. For a GPS reception unit the re-entry appears differently depending on the type of interference point. Thus with type 1—"no reception"—the re-entry is characterised in that the reception strength and the number of satellites that are received suddenly have very high values, i.e. relative reception strength for example of over 80% and the number of received satellites is 7 or more, and the characteristic measurements HDOPNOP/PDOP are very small. Therefore, the measured values suggest a high quality, but the position supplied is nevertheless subject to a clearly greater error than positions which are further away from the interference point. According to experience the GPS reception unit requires reception conditions that are consistent over some time in order to improve the position determination by means of the available correction information. In order to take this factor into account, upon leaving the interference point the GPS reception signals are weighted to such an extent that the effect of the position supplied by the GPS reception unit is only of significance if it largely corresponds to the position calculated by the methods within the interference position—deviation max. 15 m-20 m. This weighting is only ever processed with continuous distancing from the interference point when the position supplied by the GPS reception unit largely corresponds to the calculated position. The weighting of the exertion of influence is dependent upon location and can follow a mathematical function (linear, log., etc.) or be adapted to the empirical values by means of table coefficients. By combining the location-dependent information from the interference point data bank and the measurements supplied by the signal device, we define the threshold value of the transition to normal operation—away from the known interference point—so that in a sequence of 10 positions, which are supplied by the GPS reception unit, the deviation from the calculated position (without taking into account the position supplied by the GPS reception unit) may be no more than 15 m-20 m. Here the quality of the GPS signal supplied by the GPS reception unit (derived from HDOP/VDOP/PDOP) may be no worse than the values ascertained by us (<3, <4, <6). As the distance from the interference point increases, the weighting of the position supplied by the GPS reception unit becomes greater. This method is applied in every "no reception"-type interference point region described in the data bank. With other types of region or area of deficient or lacking navigation signal reception, i.e. with "reduced signal strength", "restricted view of the sky" and "signal reflection", the weighting of the position information supplied by a GPS reception device is changed in a comparable manner upon leaving an interference point.

DESCRIPTION OF THE DRAWINGS

Additional advantages, features and possible applications of the present invention emerge from the following description of preferred exemplary embodiments in connection with the drawings. These show as follows:

FIG. 1 shows the graphical illustration of two regions 1, 2 or areas with different navigation signal reception, the outer, upper region 1 representing optimal navigation signal reception. The inner, lower region 2 illustrates predictably deficient or lacking navigation signal reception. This can be, for example, a tunnel, a bridge construction or the like.

The specified line 3 of permissible object positions crosses both regions and has a bifurcation in the interference region.

Figure 1:
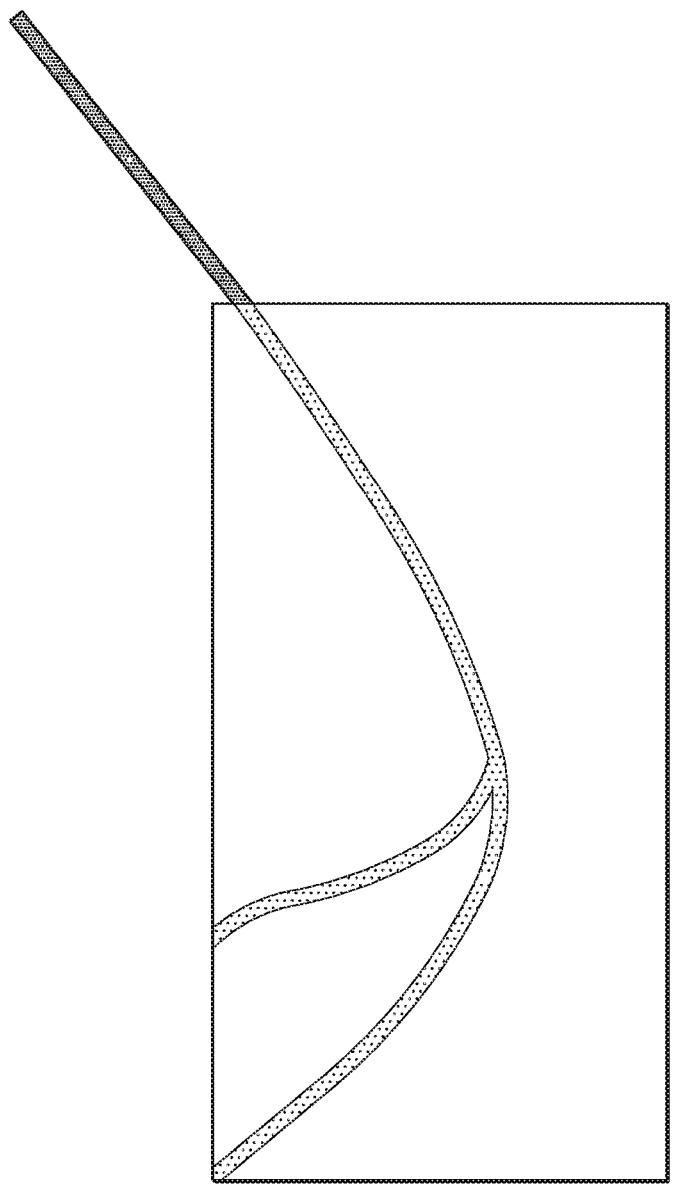
FIG. 1 the graphical illustration of two regions or areas with different navigation signal reception.
Figure 2:
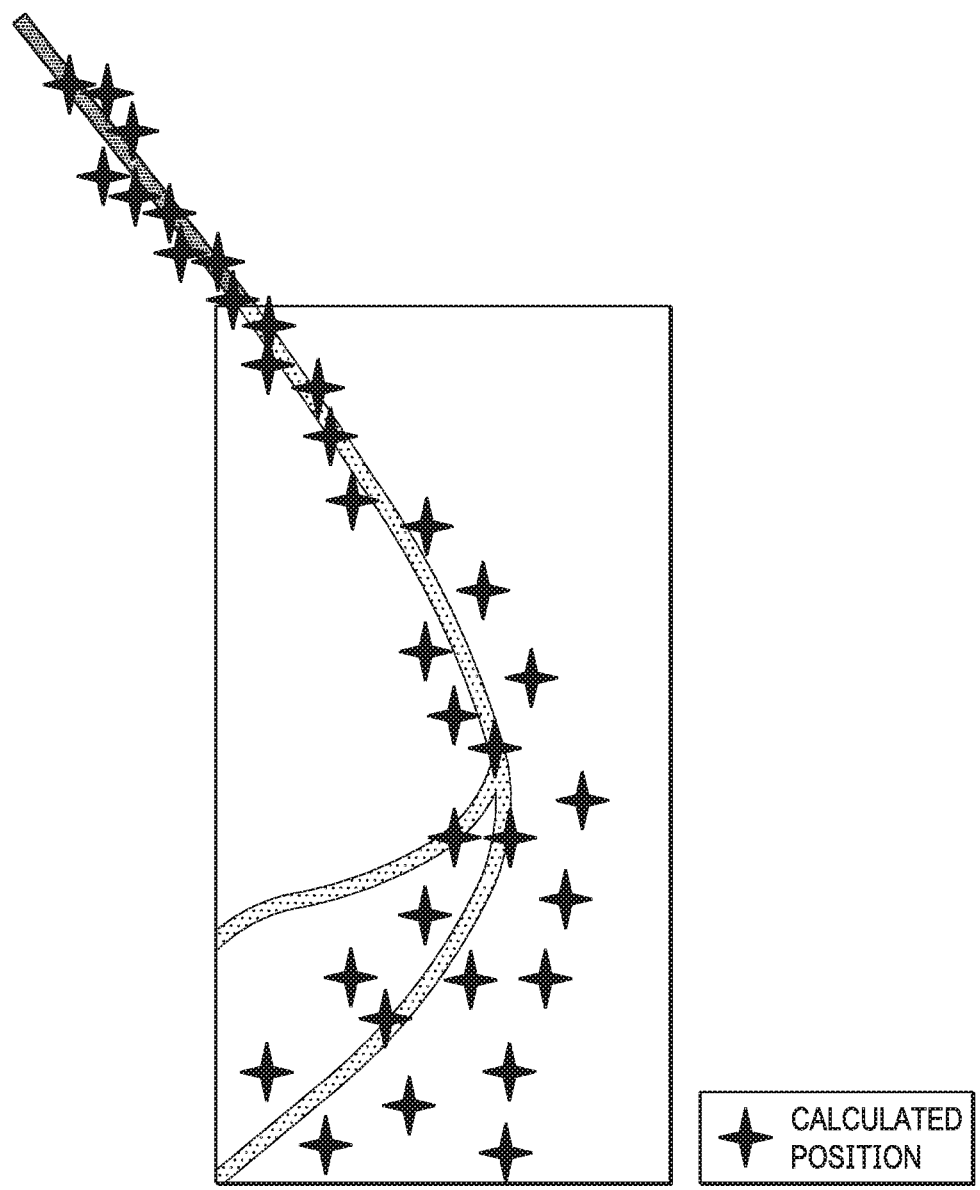
FIG. 2 an exemplary illustration of a cloud of potential object positionings.

FIG. 2 shows the data cloud of potentially permissible object positions of regions 1, 2 from FIG. 1 according to a calculation using conventionally used sensor data. The lower region 2 of deficient or lacking navigation signal reception generally has a high statistical error. The object follows the right-hand, lower path 4.

Figure 3:
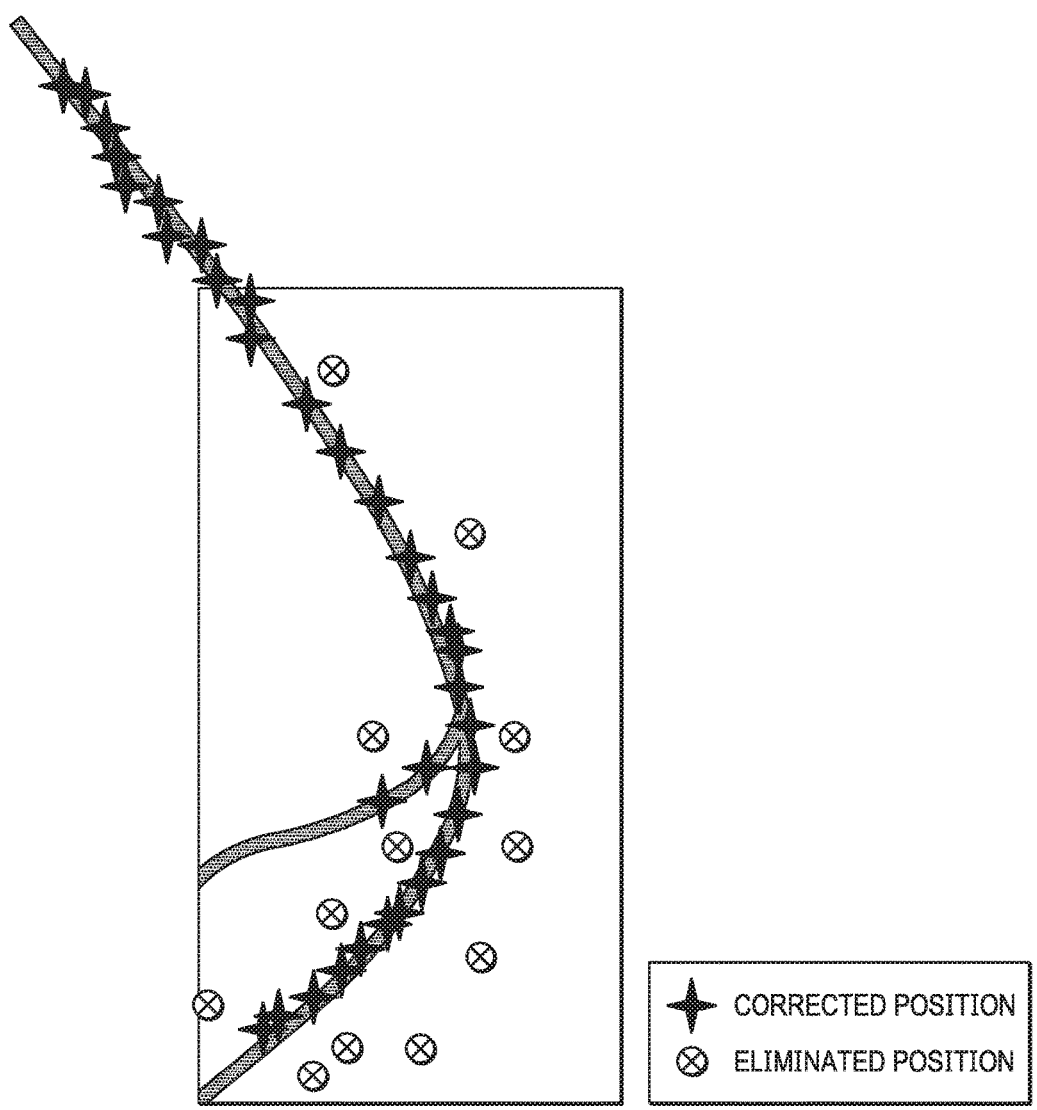
FIG. 3 a data bank according to the invention including the location and dimension of regions or areas of lacking navigation signal reception and the positioning improvement by switching on other reception devices.

In contrast, FIG. 3 shows the use according to the invention of a data bank, which provides pre-determinable positioning data for defined, predictable regions or areas 2 and sends the latter dependently upon pre-defined error information of the received navigation signals to an evaluating apparatus and/or a user terminal. The positioning data of the data bank are pre-determined spatially and/or temporally and only include predictable regions or areas of deficient or lacking navigation signal reception. For this purpose additional reception devices are pre-defined in the predictable regions or areas of deficient or lacking navigation signal reception and are optionally activated or, if appropriate, deactivated in order to improve the position determination. At the same time unlikely or impossible positions which are in conflict with the positioning data of the data bank are eliminated.

Figure 4:
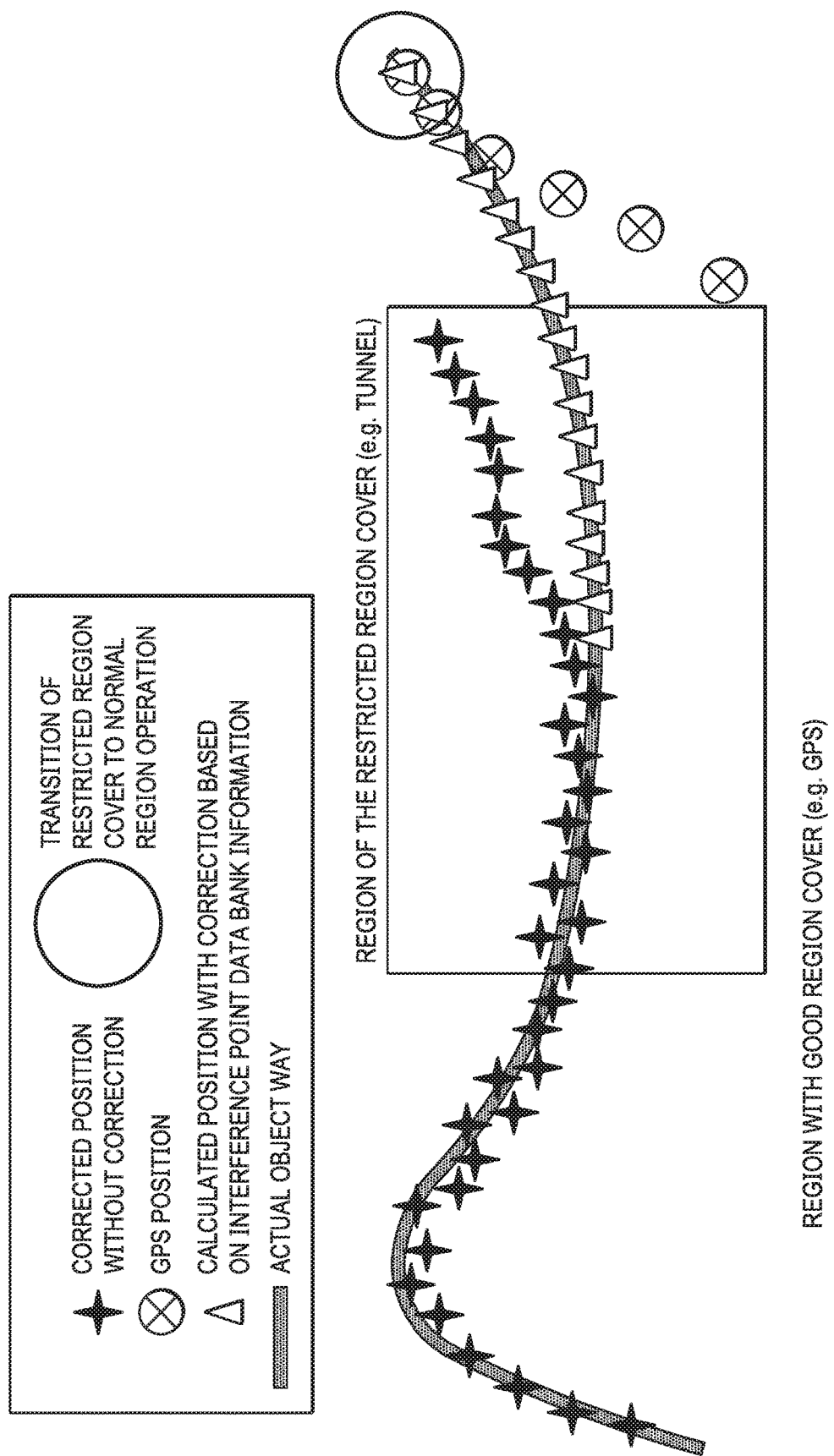
FIG. 4 an exemplary illustration of the (faulty) positions received by the GPS device according to an interference point described in the data bank and transition of the interference point consideration in the position determination to normal consideration.
Figure 5:
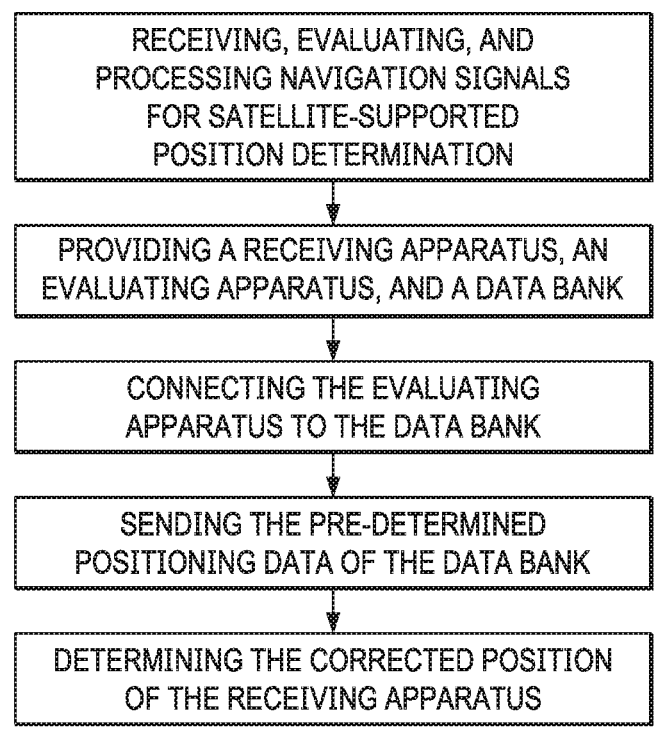
FIG. 5 a flow chart illustrating a method for receiving, evaluating and processing navigation signals for satellite-supported position determination.
Figure 6:
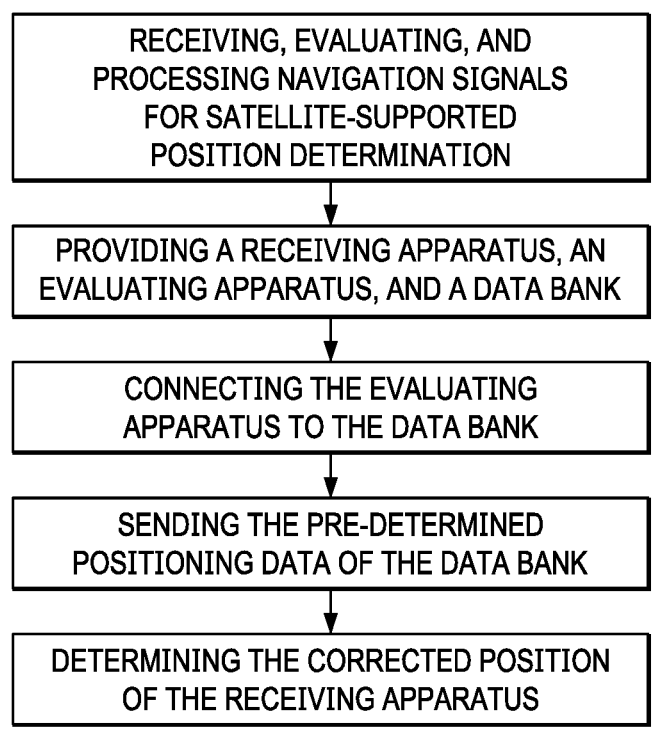

FIG. 4 shows the graphical illustration of the transition from the use of the interference point data bank described in FIG. 3 for improved position determination to normal consideration after an interference point. Since a corrected position can be determined within the interference point, upon leaving the interference point there is a reference position by means of which the new determined GPS positions are validated. Here the different quality criteria of the GPS position and the deviation of the GPS position from the current corrected position are considered. Only when the quality of the GPS position and the deviation of the GPS position with respect to the corrected position for a specific number of consecutive position determinations are below a set value (10 seconds with a deviation of less than 15 meters) is the GPS position trusted again, and it is taken into account in order to calculate a position. From this time on normal operation is re-established. Considerable deviations of the GPS position directly after the interference point are in this way reliably detected and do not lead to a faulty correction of the position determined by other reception devices.

In this way there is a considerable increase in the positioning precision. The saving in cost with respect to conventional navigation systems extends to inexpensive, sometimes freely available data bank material, short workshop conversion times and simple data carriers. Furthermore, a data bank update of the defined predictable regions or areas is clearly more convenient than with navigation data banks, if required at all.

Another advantage with respect to conventional navigation systems relates to the pro-active management of interference points instead of reactive action and an improvement of the time response of the overall system, i.e. less calculation time.

The data bank according to the invention is also particularly suitable for positioning systems that do not include a navigation data bank, for example recovery detectors, emergency call systems and tachographs.

In addition, the data bank according to the invention is also suitable for positioning systems which include navigation data banks, but can not use the latter for position correction due to the lack of road data, for example off-road (all-terrain) navigation devices, hiking guides, cycling navigation devices or positioning systems that include navigation data banks, but do not automatically recognise interference points or use out-of-date data bank material.

Furthermore, positioning systems are improved which include navigation data banks, but restrict the latter for reasons relating to cost.

All of the technical features disclosed in the present documents are claimed as essential to the invention.

KEY TO WORDING ON FIGURES

FIG. 2
berechnete Positionen=calculated positions
FIG. 3
korrigierte Positionen=corrected positions
eliminierte Positionen=eliminated positions
FIG. 4
tatsächlicher Objektweg=actual object path
berechnete Position ohne Korrektur=calculated position without correction
berechnete Position mit Korrektur basierend auf Störstellendatenbankinformation=calculated position with correction based on interference point data bank information
GPS Position=GPS position
Übergang von beschränkter Bereichsabdeckung zum normal Bereichsbetrieb=transition from restricted area coverage to normal area operation
Bereich der beschränkten Bereichsabdeckung (z. B. Tunnel)=area of restricted area coverage (e.g. tunnel)
Bereich mit guter Bereichsabdeckung (z. B. GPS)=area with good area coverage (e.g. GPS)

The invention claimed is:

1. A radio navigation device for satellite-supported position determination for receiving, evaluating and processing faulty navigation signals, containing at least one receiving apparatus and at least one evaluating apparatus, comprising:
a data bank associated with a satellite and configured to provide substantially statically stored, pre-determinable positioning data on regions where previously-detected radio navigation signals were determined to be deficient or lacking radio navigation signal reception, and send error information of the previously-detected radio navigation signals to a receiving apparatus in response a current location being at least proximate the regions or areas that are deficient or lacking radio navigation signal reception, a position of the data bank being determined when the radio navigation signals are deficient.

2. The device according to claim 1, wherein the data bank are at least one of predetermined spatially or predetermined temporally.

3. The device according to claim 1, wherein the pre-determinable positioning data of the data bank are assigned at least one error type, based on a type of deficiency determined.

4. The device according to claim 1, wherein the receiving apparatus is activated or deactivated at least one of location-dependently or at pre-defined times in predictable regions or areas of deficient or lacking radio navigation signal reception.

5. The device according to claim 4, wherein the receiving apparatus provides at least one set of range data which at least one of specifies a relative position of objects in the predictable regions or areas of deficient or lacking radio navigation signal reception.

6. A method for receiving, evaluating and processing navigation signals for satellite-supported position determination, in particular using a radio navigation device including a data bank associated with a satellite and that provides substantially statically stored, pre-determinable positioning data on regions where previously-detected radio navigation signals were determined to be deficient or lacking radio navigation signal reception, and sends error information of the previously-detected radio navigation signals to a receiving apparatus in response a current location being at least proximate the regions that are deficient or lacking radio navigation signal reception, a position being determined when the radio navigation signals are unavailable, comprising:
providing, by the radio navigation device, at least one receiving apparatus and at least one evaluating apparatus and a data bank;
connecting, by the radio navigation device, the evaluating apparatus to the data bank associated with a satellite, the data bank having positioning data which are pre-determined and comprising predictable, statically stored regions that are deficient or lacking radio navigation signal reception;
sending, by the radio navigation device, the pre-determined positioning data of the data bank based upon pre-defined location information with regard to predictable regions that are deficient or lacking radio navigation signal reception and error information of the received navigation signals to at least one of the evaluating apparatus; and
determining, by the radio navigation device, the corrected position of at least one receiving apparatus by using the positioning data of the data bank associated with a satellite, the radio navigation signals being deficient.

7. A method for receiving, evaluating and processing navigation signals for satellite-supported position determination, in particular using a radio navigation device including a data bank and that provides substantially statically stored, predeterminable positioning data on regions where previously-detected radio navigation signals were determined to be deficient or lacking radio navigation signal reception, and sends error information of the previously-detected radio navigation signals to a receiving apparatus in response a current location being at least proximate the regions that are deficient or lacking radio navigation signal reception, comprising:
providing, by the radio navigation device, at least one receiving apparatus and at least one evaluating apparatus and a data bank;
connecting, by the radio navigation device, the evaluating apparatus to the data bank, the data bank having positioning data which are pre-determined and comprising predictable, statically stored regions of that are deficient or lacking radio navigation signal reception and are associated with an error type based on the type of deficiency;
sending, by the radio navigation device, the pre-determined positioning data of the data bank dependently upon predefined location information with regard to predictable that are deficient or lacking radio navigation signal reception and error information of the received navigation signals to at least one of the evaluating apparatus;
determining, by the radio navigation device, a corrected position of at least one receiving apparatus by using the positioning data of the data bank; and
determining, by the radio navigation device, the corrected position of at least one receiving apparatus by using the error type of the predictable regions that are deficient or lacking radio navigation signal reception of the data bank.

8. The method according to claim 7, further comprising eliminating the received navigation signal data with deficient or lacking radio navigation signal reception.

9. The method according to claim 8, further comprising connecting the evaluating apparatus to the data bank, at least one of the receiving apparatuses may be predefinably activated or deactivated depending on at least one of a location or time in predictable regions or areas of deficient or lacking radio navigation signal reception.

10. The method according to claim 9, wherein range data is provided by the at least one receiving apparatus which specifies a relative position of objects in the predictable regions or areas of deficient or lacking radio navigation signal reception.

11. The method according to claim 10, wherein the range data is provided by the at least one receiving apparatus and may be pre-definably activated or deactivated upon approaching the predictable regions or areas of deficient or lacking radio navigation signal reception.

12. The method according to claim 10, wherein that range data is provided by the at least one receiving apparatus and may be pre-definably activated or deactivated upon moving away from the predictable regions or areas of deficient or lacking radio navigation signal reception.

13. The method according to claim 8, wherein the pre-determinable position data specifies a relative position of objects.

14. The method according to claim 8, further comprising adapting the algorithms of the position determination based on the error type.

15. The method according to claim 8, wherein that the position determination may be carried out up to a relative position after leaving the predictable regions or areas of deficient or lacking radio navigation signal reception dependently upon range and the error type on the predictable regions or areas of deficient or lacking radio navigation signal reception.

\* \* \* \* \*